(12) United States Patent
Paramu et al.

(10) Patent No.: US 8,650,531 B2
(45) Date of Patent: Feb. 11, 2014

(54) FRAMEWORK FOR REALIZATION OF A WEB 2.0 FEATURES

(71) Applicant: Infosys Limited, Bangalore (IN)

(72) Inventors: Sreekumar Paramu, Bangalore (IN); Brijesh Deb, Bangalore (IN); Ruchali Dodderi, Bangalore (IN); Freddi Gyara, Bangalore (IN)

(73) Assignee: Infosys Limited (IN)

( * ) Notice: Subject to any disclaimer, the term of this patent is extended or adjusted under 35 U.S.C. 154(b) by 0 days.

(21) Appl. No.: 13/676,808

(22) Filed: Nov. 14, 2012

(65) Prior Publication Data

US 2013/0090989 A1    Apr. 11, 2013

Related U.S. Application Data

(63) Continuation of application No. 12/315,082, filed on Nov. 25, 2008, now Pat. No. 8,402,425.

(30) Foreign Application Priority Data

Nov. 26, 2007 (IN) .......................... 2754/CHE/2007

(51) Int. Cl.
*G06F 9/44* (2006.01)

(52) U.S. Cl.
USPC .......................... 717/101; 717/100

(58) Field of Classification Search
None
See application file for complete search history.

(56) References Cited

U.S. PATENT DOCUMENTS

| | | | |
|---|---|---|---|
| 7,908,323 B2* | 3/2011 | Lim | 709/205 |
| 2008/0222628 A1* | 9/2008 | Batra et al. | 717/171 |
| 2008/0288914 A1* | 11/2008 | Schmitter | 717/101 |
| 2009/0249290 A1* | 10/2009 | Jenkins et al. | 717/109 |
| 2010/0241971 A1* | 9/2010 | Zuber | 715/753 |

\* cited by examiner

*Primary Examiner* — Philip Wang
(74) *Attorney, Agent, or Firm* — Lerner, David, Littenberg, Krumholz & Mentlik, LLP

(57) ABSTRACT

A method to shape one or more features of Web 2.0 in the form of Web 2.0 solutions, using Web 2.0 realization framework, to the plurality of enterprises is disclosed. The method includes identifying the respective enterprises computing infrastructure and a business application needs of the respective enterprises. The respective enterprises current support system is also measured to find the feasibility of implementing the features of the Web 2.0. The method further comprises offering one or more Web 2.0 features to the respective enterprises based on the business activity. The method includes providing the Web Realization Cycle (WRC) for controlled implementation of Web 2.0 features to the respective enterprises.

9 Claims, 11 Drawing Sheets

FRAMEWORK FOR REALIZATION OF A WEB 2.0 FEATURES

CROSS-REFERENCE TO RELATED APPLICATIONS

The present application is a continuation of U.S. patent application Ser. No. 12/315,082, filed Nov. 25, 2008, the disclosure of which is incorporated herein by reference.

BACKGROUND OF THE INVENTION

The present invention relates to a Web 2.0, and more particularly, to a method of incorporating one or more Web 2.0 features in the form of a Web 2.0 solution(s), using a Web 2.0 Realization Framework, for one or more enterprises having plurality of business activities.

The phrase a Web 2.0 is the most talked emerging technology in an Information Technology (IT) industry, used in different industries (herein referred as "enterprises") including financial service or retail and many more. The Web 2.0 is creating quite a splash in the enterprises, as the Web 2.0 is stretching the boundary of what traditional Web can do. However an exact definition of the phrase is still missing, interpretations vary with evangelists, thought leaders and product vendors. In the absence of any consensus, Web 2.0 may best be explained as the second-generation in an evolution of the Web to provide enriched end user experience, social networking and collaboration capabilities.

The Web 2.0 comprises rich set of features, based on the set of principles focusing on architecture of user participation, user centricity, collective intelligence, multi-device services, simplicity, openness, transparency, innovation and long tail of economics. Naturally Web 2.0 provides lot of implications for plurality of enterprises to avail business benefit. However, despite many promises of the Web 2.0, realization of the Web 2.0 features in the plurality of enterprises is very slow. This may be partly attributed to the fact that all of the Web 2.0 features may not be applicable to plurality of enterprises. Moreover the technology enabler of Web 2.0 does not come out of box as a single technology product or a business application product.

In the current market, there are several disparate technologies available that may be used to realize the individual features of Web 2.0. However, a holistic approach for realization one or more features Web 2.0 in plurality of enterprises is lacking. Also, few other challenges currently the enterprises facing to realize the features of Web 2.0 may include the difficulty in identifying the relevant Web 2.0 services and initiatives the enterprises should undertake given its business and stakeholder priority. Other problem for the enterprises may include, how does Web 2.0 fit into existing enterprises computing infrastructure else what all technologies, tools and standards need to be leveraged to implement Web 2.0 features else what services and systems does an enterprise need to support Web 2.0 features and derive business benefits out them. Finally, what approach should the enterprises adopt to realize Web 2.0 feature—big bang or a phased progressive approach or etc.

Thus, there is a need for a framework that helps to implement or realize the Web 2.0 features in the plurality of enterprises.

The framework may provide the plurality of enterprises a holistic approach for implementing one or more features of Web 2.0 and capitalize the business benefit out of the Web 2.0.

SUMMARY OF THE INVENTION

A holistic approach for incorporating one or more Web 2.0 features in the form of a Web 2.0 solution(s) using a Web 2.0 Realization Framework (WRF) to a plurality of enterprises. Such an approach may permit one or more business activities of a respective enterprise(s) to be kitted together with a superior user experience and leverage social networking and collaboration.

In one embodiment of the present technique, the WRF for incorporating one or more features in the form of Web 2.0 solutions includes a first layer for assessing the capabilities of each of the plurality of enterprises implementing the Web 2.0 solutions and a second layer for measuring a current support system of each of the plurality of enterprises for supporting different features of the Web 2.0 solutions. The WRF further comprises, a third layer providing at least one or more Web 2.0 features to each of the plurality of enterprises and a fourth layer defining a controlled structure having a Web 2.0 Realization Cycle (WRC) for implementation of WRF in each of the plurality of enterprises to enhance business benefits of the plurality of enterprises.

In one embodiment of the present technique, the WRF may be implemented in multiple ways to the plurality of enterprises using the controlled structure as defined in WRC. The WRF may be used as an interactive tool to shape a Web 2.0 solution(s) to the plurality of enterprises. The WRC for implementing the WRF in each of the plurality of enterprises is an iterative process, thus enabling the plurality of enterprises to encash maximum business benefit.

In another embodiment of the present technique, a controlled structure having a Web 2.0 realization cycle (WRC) for implementation WRF in a plurality of enterprises includes engaging a plurality of users to participate in one or more business activities of each of the plurality of enterprises and enriching the plurality of users overall user experience by providing one or user experience enrichment module. The WRC also includes the steps of empowering the enterprises with the insights of the plurality of users by providing one or more user active insights module(s) and enables enterprises to encash the business benefits by providing a capitalization module.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to a Web 2.0 solution(s), and more particularly, to a method for incorporating one or more features of Web 2.0, using a Web 2.0 Realization Framework (WRF), for one or more enterprises having plurality of business activities.

The following description is presented to enable a person of ordinary skill in the art to make and use the invention and is provided in the context of the requirement for obtaining a patent. The present description is the best presently contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

Figure 1:
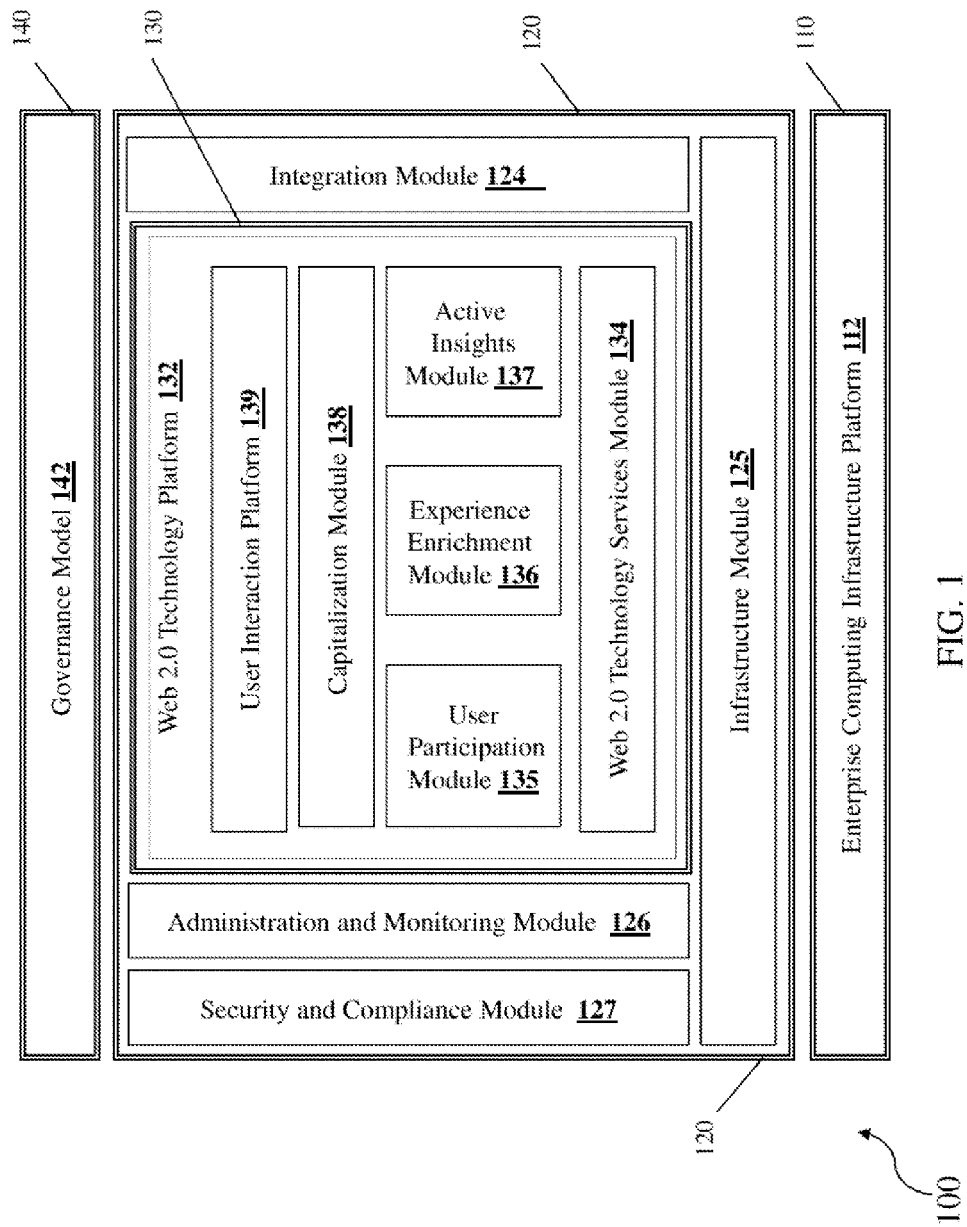
FIG. 1 is a block diagram showing an integrated layers comprising one or more modules configured in a Web 2.0 Realization Framework (WRF) for implementing a Web 2.0 features in the form of Web 2.0 solutions(s) in a plurality of enterprises, in one embodiment of the present technique.

Referring to the figures, FIG. 1 is a block diagram depicting a Web 2.0 Realization Framework (WRF) 100 used to implement a plurality of Web 2.0 features in one or more enterprises having a plurality of business activities. The WRF includes a plurality of integrated layers. The integrated layers further comprising a first layer 110 (herein also referred as "technology layer"), a second layer 120 (herein also referred as "support layer"), a third layer 130 (herein also referred as "main layer") and a fourth layer 140 (herein also referred as "control layer").

In one embodiment of the present technique, the main layer 130 and the support layer 120 may rest on top of the technology layer 110. The control layer may ensure success in implementing the Web 2.0 solutions in each of the plurality of enterprise(s).

The integrated layers in the WRF may consist of at least one or more modules, which may be clearly identified as per the Web 2.0 definition. Also, some of the modules as per the WRF, which are associated with conventional technologies and other contemporary technologies cannot benefit the plurality of enterprises when implemented separately. To leverage full potential of Web 2.0, each of the plurality of enterprises applications which are based on a Web 2.0 principles may be integrated with other respective enterprises services and computing environment. The WRF identifies such Web 2.0 and a Non Web 2.0 module(s) which are required to build full fledged enterprises applications using the Web 2.0 solutions.

In one embodiment of the present technique, the first layer 110 comprises an enterprises computing infrastructure platform 112. The enterprises computing infrastructure platform 112 is further configured with at least one or more modules providing a plurality of basic computing infrastructure for implementing one or more features of the Web 2.0. The enterprises computing infrastructure platform 112 may include at least one of an enterprises application module 114 or an integration module 115 or a collaboration module 116 or an information management module 117 (not shown in the FIG. 1 for clarity purpose).

The enterprises computing infrastructure platform 112 including at least one of an enterprises application module 114 or an integration module 115 or a collaboration module 116 or an information management module 117 providing essential information technology in the respective enterprises computing environment. These modules of the technology layer 110 may act as a foundation layer for implementing the WRF in the respective enterprises. However, the enterprises computing infrastructure platform 112 may comprise more modules, which are omitted or simplified in order not to obscure the illustrative embodiments. The scope of the enterprises computing infrastructure platform 112 should not be limited in light of the present technique.

In one embodiment of the present technique, the enterprises application module 114 may represent one or more business applications of the respective enterprises as well as the corresponding computing infrastructure within the enterprises business environment. The enterprise integration module 115 provides features to integrate business applications, information and processes within and across respective enterprises boundaries. The feature includes third party products, a variety of open and proprietary protocols suitable for integrating respective enterprises requirement. The collaboration module 116 may consist of conventional collaboration applications of the respective enterprises, which includes application like an e-mail, an instant messaging, a basic collaboration portal(s), a telecommunication means and etc. The information management module 117 may represent one or more applications and technologies that enable a proper management of a structured data or an unstructured data within and across the respective enterprises boundaries. This may include at least one of a content management or a content delivery or a database management system or a data warehouses or a business intelligence application. The business intelligence application may further include at least one of a web analytics or a data analytics or internationalization or localization or a business rules or a workflow etc.

In one embodiment of the present technique, the second layer 120 comprises enterprises support system platform 122 (not shown in the figure). The enterprises support system platform 122 is further configured with at least one or more modules for providing the necessary support for implementing the WRF in the respective enterprises. The enterprises support system platform 122 may include at least one of an integration module 124 or an infrastructure module 125 or an administration & monitoring module 126 or a security & compliance module 127. However, the enterprises support system platform 122 may comprise more modules, which are omitted or simplified in order not to obscure the illustrative embodiments. The scope of the enterprises support system platform 122 should not be limited in light of the present technique.

The integration module 124 may integrate multiple layers in the WRF and also may enable integration with the respective enterprises' internal and external consumer. The integration module may even leverage an intra-enterprises and inter-enterprises technology. The integration module 124 of the enterprises support system platform 122 may includes one or more modules. The modules may be a composite applications module 124A or an enterprise service module 124B or an external business services module 124C or an integration components module 124D (the modules are not shown in the figure for clarity purpose). The composite applications module 124A may enable creation of new applications by integrating existing respective enterprises services and existing external enterprises business services. The enterprise service module 124B may represent existing internal enterprise services that participate in the composite applications module 124A, or with a new enterprises web service(s), which may be used by the external enterprises for the purpose of the composite applications module 124B. The external business services module 124C may represent existing external business services, which may be used along with the composite applications module 124B. The integration components module 124D may represent a component or a function process or an application created or developed specifically to integrate various layer of the WRF.

The infrastructure module 125 may include a hardware component(s) or a software component(s). These components may be essential for maintaining the availability, reliability, scalability, fault tolerance and performance of applications based on Web 2.0 solutions.

The administration & monitoring module 126 may provide one or more utilities required for monitoring and administration of the integrated layers in the WRF. The utilities may include a logger, a tracker or a status dashboard.

The security & compliance module 127 may provide necessary security components and the associate compliance required for the respective enterprise implementing the WRF. The security & compliance module 127 may includes one or more module. The security and compliance module includes at least one of an identity and access management module (not shown in the FIG. 127A or a digital rights management module 127B or a compliance management module 127C. The identity and access management module 127A may provide the plurality of user, the authentication and authorization to use the respective enterprises applications. The module 127A may even control and protect legitimate users having rights and privilege for using the resources from the other users, whom do not having the rights. The digital rights management module 127B may control access to the digital data hosted in the respective enterprises. The compliance management module 127C may ensure compliance with the respective enterprises' external regulatory requirements as well as the respective enterprises' internal regulatory requirements. Thus the module 127C helps to alleviate the respective enterprises from probable risks associated with the content or with the applications requiring publishing.

In one embodiment of the present technique, the third layer comprises a Web 2.0 technology platform 132. The Web 2.0 technology platform 132 is further configured with at least one or more modules for implementing plurality of Web 2.0 features as tailored in the WRF framework for the respective enterprises. The Web 2.0 technology platform 132 may include at least one of a Web 2.0 technology services module 134 or a user participation module 135 or an experience enrichment module 136 or an active insights module 137 or a capitalization module 138 or a user interaction platform 139.

In one embodiment of the present technique, the Web 2.0 technology services module 134 may provide necessary technology capabilities, which are used in other integrated layers to provide Web 2.0 features. The user participation module 135 may include modules for supporting the plurality of users to participate in social networks to connect and communicate among themselves. The experience enrichment module 136 provides capabilities that enrich user experience and facilities faster decision making capabilities. The active insights module 137 may provide dynamic decision making capabilities for the respective enterprises based on the information or pattern extracted out of the user participation module 135 or out of the experience enrichment module 136. The capitalization module 138 may provide capabilities to derive business value or business benefit out of the WRF implemented in the respective enterprises. The user interaction platform 139 enables various communications channels for the plurality of users to interact with the respective enterprises.

Figure 8:
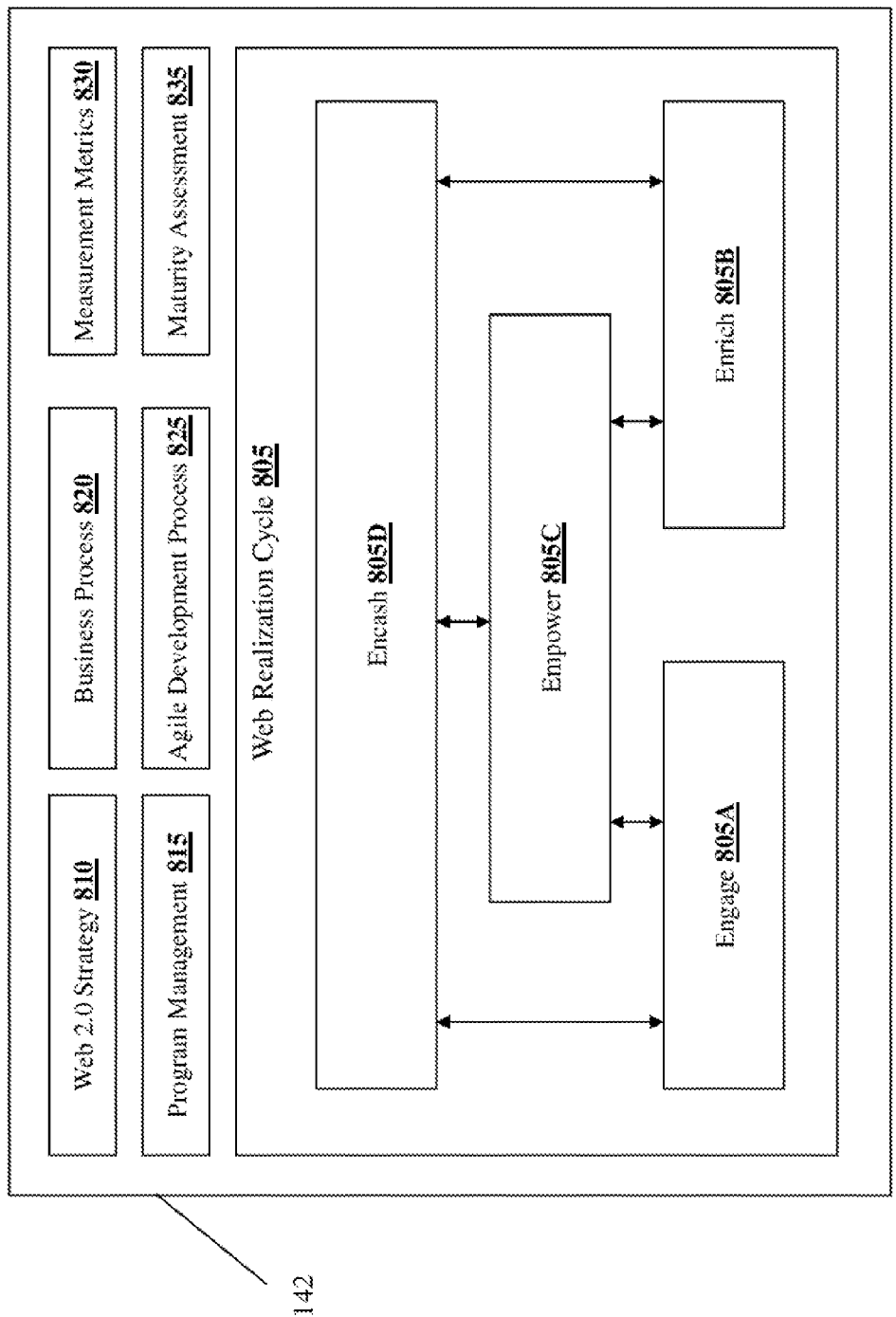
FIG. 8 is a block diagram showing one or more phases configured in a governance model for defining a controlled structure in implementation of Web 2.0 solutions, according to one embodiment of the present technique.

In one embodiment of the present technique, the fourth layer 140 comprises a governance model 142. The governance model 142 defines a controlling structure for successful implementation of WRF. The governance model 142 may define the lifecycle of Web 2.0 initiatives for the respective enterprises. The lifecycle may consist of one or more phase, which includes at least one of an engage phase or a enrich phase or an empower phase or an encash phase (as shown in FIG. 8). The phases recited in the lifecycle may be used in an iterative manner for implementing the WRF in plurality of enterprises. The iterative manner of using the phases may maximize the business benefit for the respective enterprises.

Figure 2:
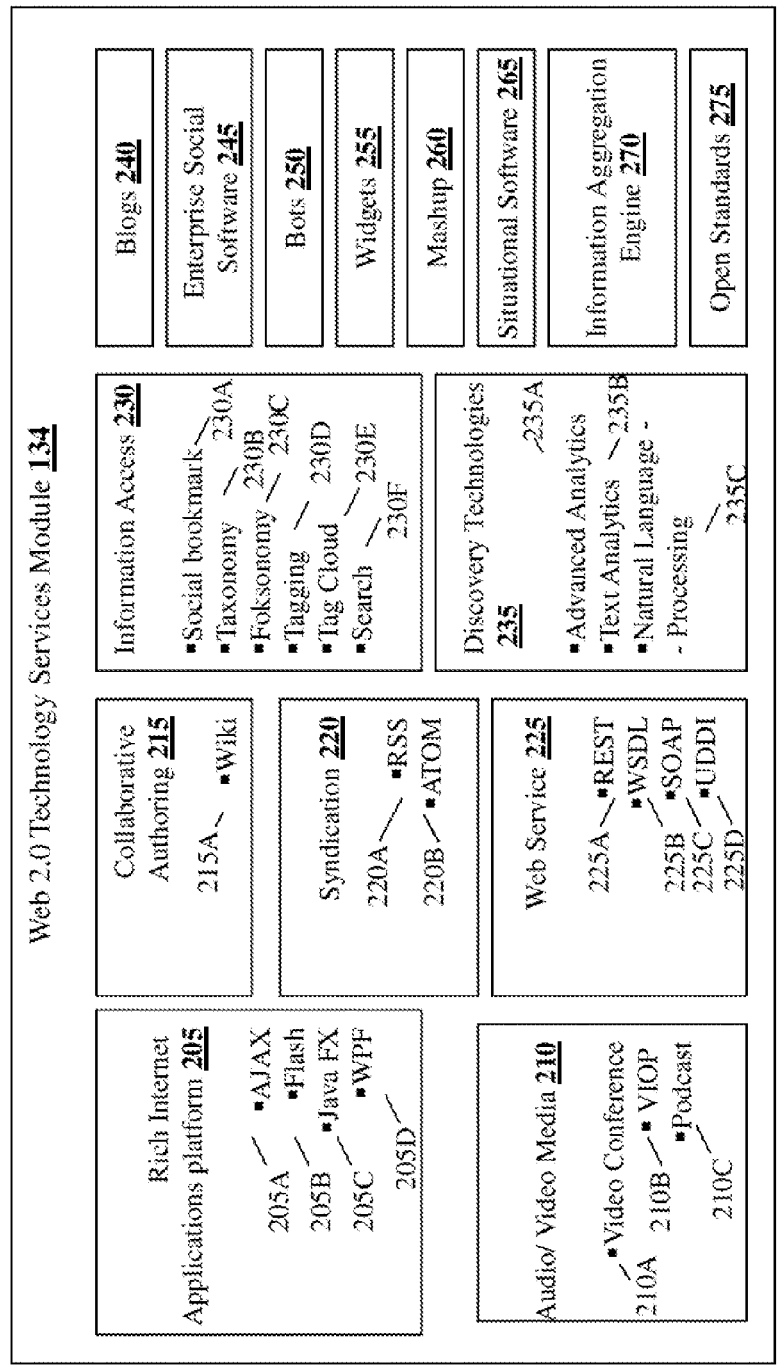
FIG. 2 is a block diagram showing a Web 2.0 Technology Services Module layer configured in a Web 2.0 technology platform for a technology capabilities to implement the Web 2.0 features, according to one embodiment of the present technique.

FIG. 2 is a block diagram showing a Web 2.0 technology services module 134 configured in the Web 2.0 technology platform 132 for the technology capabilities to implement the Web 2.0 features, according to one embodiment of the present technique. The Web 2.0 technology services module 134 is configured with at least one or more technology or product or tool or standard, which are used in other integrated layers to provide the Web 2.0 features, while implementing the WRF in the respective enterprises.

In one embodiment of the present invention, the Web 2.0 technology services module 134 includes various technology or products or tools or standards including at least one of a rich internet applications (RIA) platform products 205 or an audio/video media technologies 210 or a collaborative authoring technologies 215 or a syndication technologies 220 or a web service technology 225 or an information access technologies 230 or a discovery technologies 235 or a Blogs technologies 240 or an enterprises social software 245 or a bots technology 250 or a widgets products 255 or a mash-up products 260 or a situational software 265 or a information aggregation engine 270 or a open standards 275 or combinations thereof.

The rich internet platform products 205 (RIA) may provide one or more capabilities the respective enterprises may need to enrich the visually rich interfaces. The prominent RIA platform 205 technologies may include at least one of an Ajax 205A or a Flash 205B or a Java FX 205C or a WPF 205D or combinations thereof. However, the RIA products 205 may comprise more modules, which are omitted or simplified in order not to obscure the illustrative embodiments. The scope of the RIA products 205 should not be limited in light of the present technique The Audio/Video Media technologies 210 may provide support for audio or video capabilities. The prominent Audio/video media technologies may include at least one of a Video conference 210A or a Voice over IP (VoIP) 210B or a pod-cast 210C or combinations thereof.

The collaborative authoring technologies 215 may provide Web based collaborative authoring capabilities, using which multiple users may create contents or edit shared contents. The prominent collaborative authoring technologies 215 include wiki 215A.

The syndication technologies 220 may enable the multiple users to make their contents available for distribution over the web. The prominent syndication protocols include at least one of a RSS 220A or an ATOM 220B or combinations thereof.

The web service technologies 225 provide service over the network and are remotely executable. The prominent web service standards include at least one of a REST 225A or a WSDL 225B or SOAPC 225C or UDDI 225D or combinations thereof. However, the web service technologies 225 may comprise more services, which are omitted or simplified in order not to obscure the illustrative embodiments. The scope of the web service technologies 225 should not be limited in light of the present technique The information access technologies 230 may provide the multiple users access the enterprises information easily. The information access 230 may include a social bookmark 230A or taxonomy 230B or a folksonomy 230C or a tagging 230D or a tag cloud 230E or search 230F facilities to the users.

The discovery technologies 235 may provide the support to discover the hidden pattern and find non obvious content to the plurality of the enterprises. The discovery technologies 235 may involve advanced analytics and natural language processing associated with text or audio or video. The discovery technologies 235 may include at least one of an advanced analytics 235A or a text analytics 235B or a natural language processing 235C technologies or combinations thereof.

The Blog technologies 240 may enable the multiple users to create contents and publish the content over the internet. The typical blog entry may contain text or an image or a links or other media related contents. Although most blogs are textual, some may even focus on photographs called as photoblogs or on videos called as videoblogs.

The enterprise social software 245 may provide capabilities to create and manage online communities by forming user groups.

The bots products 250 may provide the support for automating interactive question or answering process. The blots products 250 differ from the conventional FAQ's, which comprises a predefined set of questions and answers. The bots products enable users to ask random questions around a predefined subject and supply with answers, which are generated on the fly based on a knowledge base. The bots application 250 is typically used for self services features.

The widget technology 255 may reside on the multiple user desktop providing capsule information from sources on the web.

The mash-up technology 260 may combine information and services from multiple source on the web and typically includes a complex layered visual contents.

The situational software 265 may provide support for creation and management of situational products.

The information aggregation engine 270 may provide multiple techniques and methodologies for aggregation of content generated by multiple users to derive unique result.

The open standards 275 may encompass a wide variety of industry open standards for the information technology as well as for the business domain specific standards.

Figure 3:
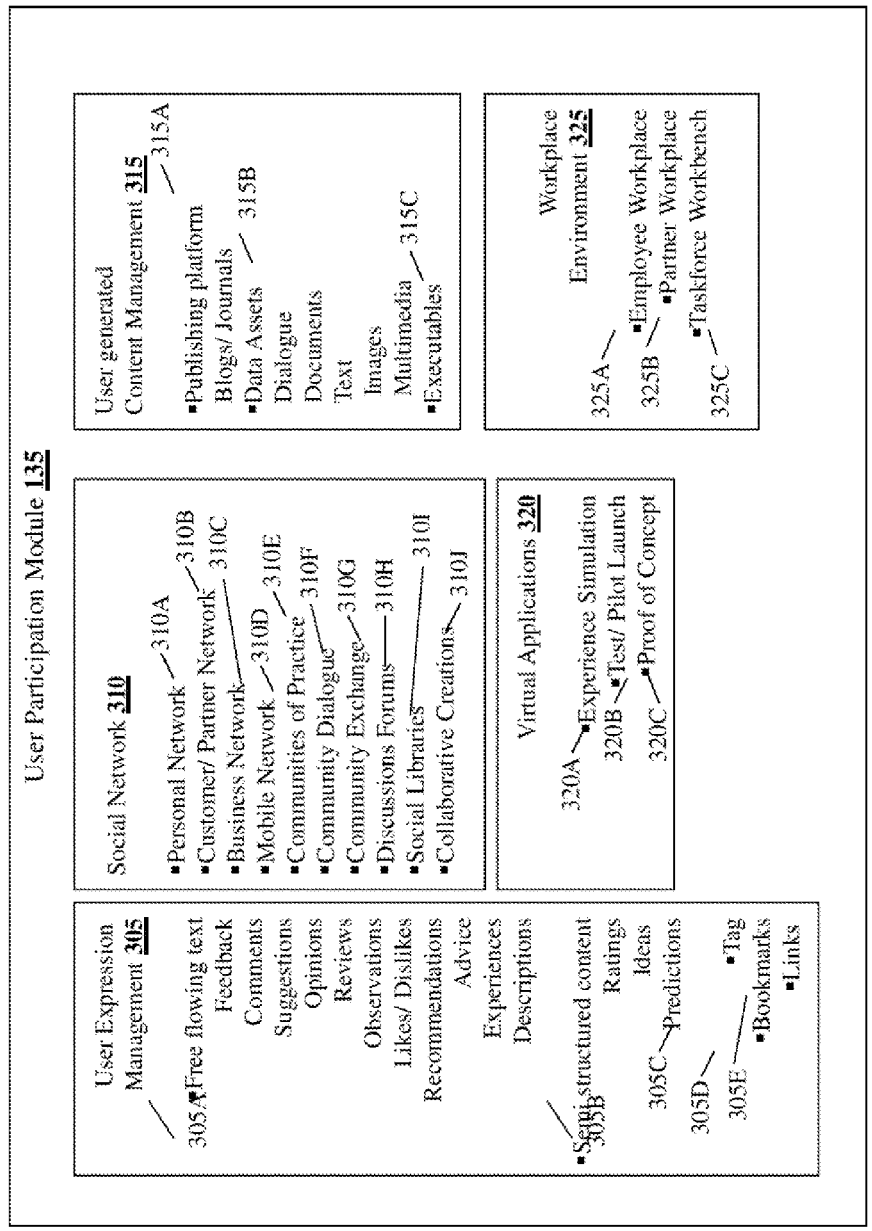
FIG. 3 is a block diagram showing an user participation module configured in the Web 2.0 technology platform for an active involvement of plurality of users in the respective enterprises one or more business activity, according to one embodiment of the present technique.

FIG. 3 is a block diagram showing the user participation module 135 configured in the Web 2.0 technology platform 132 for an active involvement of plurality of users in the respective enterprises one or more business activity, according to one embodiment of the present technique. The user participation module 135 is configured with at least one or more modules for providing multiple users the platform for active participation in the respective enterprises at least one or more business activity.

In one embodiment of the present technique, the user participation module 135 may includes various module including at least one of an user expression management module 305 or a social network module 310 or a user generated content management module 315 or a virtual applications module 320 or a workplace environment module 325 or combinations thereof.

The user expression management module 305 may facilitate the platform to capture or store or manage various types of an element using which an individual user may reflect expressions and provide inputs about various aspects of enterprise business. The user expression management module 305 may be associated with specific aspects of current and future enterprises business like products or services or operations or processes or people or organizational changes or a financial asset of the particular enterprises. The user expression management module 305 is managed in one or more categories. The categories include free flowing text 305A or a semi structured content 305B or a tag 305C or a bookmark 305D or a link 305E or combinations thereof. The free flowing text categories 305A include reviews or experience or feedback or comments or a suggestion or an opinion or an observation or a recommendation or a like/dislikes or etc. The semi structured content 305B may include a rating or ideas or a recommendations or etc. The user expression module 305 may include other categories without limiting to the scope of the present invention.

The social network module 310 may enable the particular enterprises to capture and manage a group expression and content/assets generated by a group of users. The social network module 310 is managed in one or more categories. The categories include a personal network or a business network or a customer/partner network or a mobile network or a community of practice or a community dialogue or a community exchange or a discussion forum or a social library or a collaborative creation or combinations thereof. The personal network 310A provides capabilities for individual users to create and manage communities of their personal contacts within and across enterprises boundaries. The business network 310B provides capabilities for respective enterprises users to create and manage communities of their business contacts within and across enterprises boundaries. The customer/partner network 310C provides capability to create and manage partner/customer communities for the respective enterprises. The mobile network 310D enables access to the social network over a mobile infrastructure. The community of practice 315E is enables the multiple users, sharing based on a specific area of interest or focus. The community dialogue 310F represents capture management and sharing of community expressions and community generated content within communities. The community exchanges 310G represents management communication and information across multiple communities. The discussion forums 310H represent a special type of community dialogue focused around a specific subject. The social libraries 310I represent a repository of a specific category of business assets as well sharing the repository across communities. The collaborative creation 310J enables participation of communities for the purpose of collaboratively creating a specific business asset.

The user generated content management module 315 may provide support for creation and management of assets generated by users. Various categories of the user generated module 315 include at least one of a publishing platform 315A or a data asset 315B or an executables 315C or combinations thereof. The publishing platform 315A facilitates creation and management of user blogs or journals. The data assets 315B include the data like a text or a document or an image or a multimedia or etc. The executables 315C include utility software or a games and etc.

The virtual applications module 320 is a web based virtual application enabling the one or more users to explore the feel of using the product or the application hosted by the respective enterprises either in the form of a group or individual activities. The virtual applications module 320 may even simulate real life experience 320A to the users or test launch new product 320B or service capabilities to the multiple users or provide the proof of concept 320C to the multiple users.

The workplace environment module 325 may combine multiple Web 2.0 enabled components that are clubbed with a workplace environment for an active and collaborative participation of multiple users. Typically, several modules from the user participation module 135, the experience enhancement module 136 and active insight module 137 are clubbed and integrated for provided clubbed workplace environment 325. The workplace environment module 325 includes at least one of an employee workbench 325A or a taskforce workbench 325B or a partner workbench 325C or combination thereof. The employee workbench is aimed to improve workplace productivity and efficiency of the employee within the enterprises. The taskforce workbench 325B is aimed at global virtual communities with a focus to accomplish specific goals for an enterprises or group of enterprises. The partner workbench 325C is aimed at collaborating respective enterprises partner.

Figure 4:
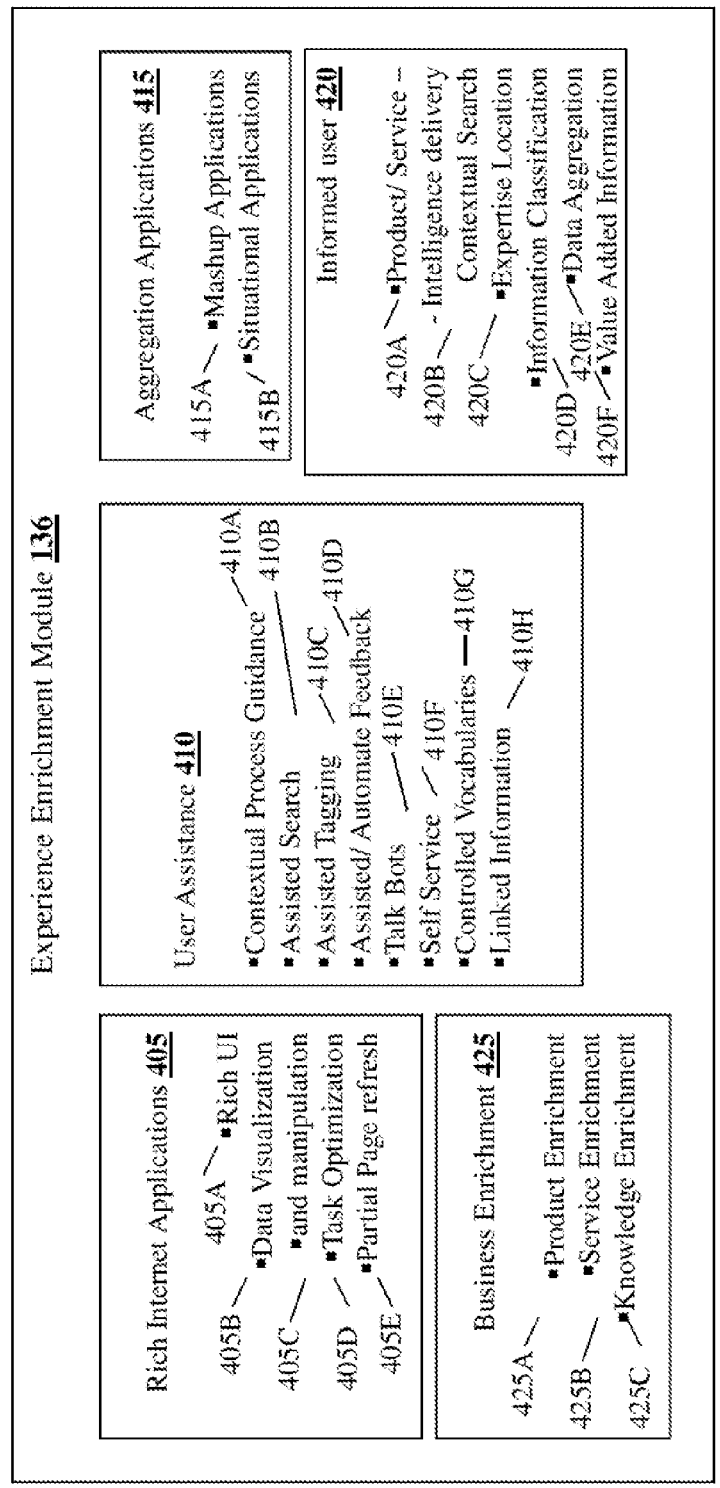
FIG. 4 is a block diagram showing an experience enrichment module configured in the Web 2.0 technology platform for providing the capabilities that enrich the plurality of user experience and facilitating faster decision making capabilities, according to one embodiment of the present technique.

FIG. 4 is a block diagram showing an experience enrichment module 136 configured in the Web 2.0 technology platform 132 for providing the capabilities that enrich the plurality of user experience and facilitating faster decision making capabilities, according to one embodiment of the present technique. The experience enrichment module 136 is configured with at least one or more modules for providing multiple users the platform for better end user experience and facilities enabling faster decision making capabilities.

In one embodiment of the present technique, the experience enrichment module 136 may include various modules including at least one of a rich internet applications module 405 or a user assistance module 410 or an aggregation applications module 415 or an informed user module 420 or a business enrichment module 425 or combinations thereof.

The RIA module 405 provides the multiple users the rich and intuitive end user experience functionality. The RIA module 405 comprises a rich user interface (UI) capabilities 405A or data visualization and manipulation capabilities 405B or a task optimization capabilities 405C or a partial page refresh capabilities 405D and etc.

The user assistance module 410 enables the multiple users to accomplice their tasks through using at least one capabilities of a contextual process guidance 410A or an assisted search 410B or an assisted tagging 410C or an automated feedback 410D or a talk bots 410E or a self service applications 410F or a controlled vocabularies 410G or a linked information 410H or combinations thereof. The contextual process guidance 410A provides help regarding the business process execution. The assisted search 410B provides automated interactive help or assistance for refining search. The assisted tagging 410C assist the multiple users with tagging by providing suggested names or labels. The automated feedback 410D assists the multiple users in the feedback process. The talk bots 410E provide automated self help on a specific subject through a series of interactive questions and answers. The controlled vocabularies 410G helps the multiple users with tagging and other form of the dialogue. The linked information 410H enables access to relevant information.

The aggregation application module 415 aggregates data or services from different source on the web. Also, the aggregation application module 415 enables multiple users to aggregate data on their own. The aggregation application module 415 may include at least one of a mash-up application or a situational applications or combinations thereof.

The informed user module 420 provides information about the respective enterprise to the multiple users. The informed user module 420 may include at least one of a product/service intelligence capabilities 420A or a contextual search capabilities 420B or an expertise location capabilities 420C or a information classification capabilities 420D or a data aggregation capabilities 420E or a value added information capabilities 420F or combinations thereof.

The business enrichment module 425 may involve strategies enabling the respective enterprises to introduce new products 425A or services 425B or enhance existing products or services based on the user or the community expressions. The knowledge enrichment capabilities 425C ensures the multiple users or communities aware of others contribution.

Figure 5:
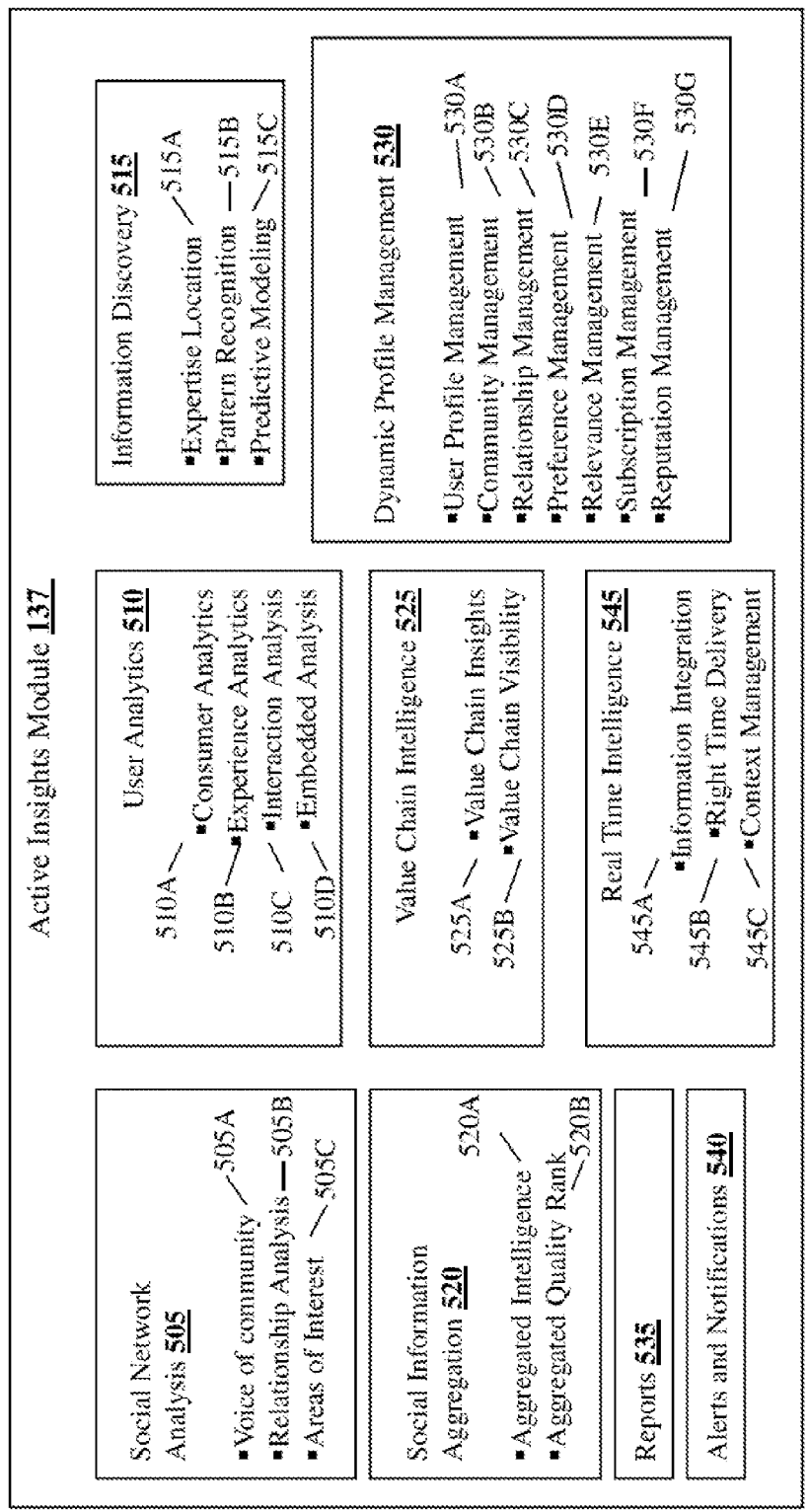
FIG. 5 is a block diagram showing an active insights module configured in the Web 2.0 technology platform to provide dynamic decision making capabilities for the respective enterprises, according to one embodiment of the present technique.

FIG. 5 is a block diagram showing the active insights module 137 enabling dynamic decision making capabilities for the respective enterprises, according to one embodiment of the present technique. The active insights module 137 is configured with at least one or more modules for providing dynamic decision making capabilities for the respective enterprises based on the information or pattern extracted out of the user participation module 135 or out of the experience enrichment module 136 or combinations thereof.

In one embodiment of the present technique, the active insights module 137 may include various module including at least one of an social network analysis module 505 or a user analytics module 510 or a discover info module 515 or a social information aggregation module 520 or a value chain intelligence module 525 or a dynamic profile management module 530 or a reports module 535 or a alerts and notification module 540 or a real time intelligence module 545 or combinations thereof.

The social network analysis module 505 may provide the analytics result associated with the communities or groups or combinations thereof. The social network analysis module 505 includes at least one of a voice of community capabilities 505A or relationship analysis capabilities 505B or an area of interest capabilities 505C or combinations thereof. The voice of community capabilities 505A represent process take place in the particular enterprise to review user expressions or user generated content to search/extract and analyze information that impacts the respective enterprises one or more business process. The relation analysis capabilities 505B represent specific analytics process that focus on relationship among the users and the community. Thus, extracting the information and relate to the respective enterprises one or more business process. The areas of interest capabilities 505C represent results of social network analysis for the purpose of business process.

The user analytics module 510 provides the analytics result associated with user characteristics. The results are generated by consuming analytics services of the enterprises intelligence services. The user analytics module 510 includes at least one of consumer analytics capabilities 510A or experience analytics capabilities 510B or interaction analytics capabilities 510C or an embedded analytics capabilities 510D or combinations thereof. The consumer analytics capabilities 510A are consumer specific and the specific results are used to enhance social commerce. The experience analytics capabilities 510B may represent analytics results based on multiple users online experience for the respective enterprises Web 2.0 features. The interaction analytics capabilities 510C represents results based on multiple users' online interactions on the respective enterprises Web 2.0 features. The embedded analytics 510D are technology capabilities embedding Web 2.0 related intelligence information within the respective enterprises one or business process.

The information discovery module 515 represents processes and associated results to discover non obvious information. The information discovery module 515 requires an advanced analytics capabilities of the respective enterprise intelligence services. The information discovery module 515 includes at least one of expertise location capabilities 515A or pattern recognition capabilities 515B or a predictive modeling capabilities 515C or combinations thereof. The expertise location capabilities 515A help the end users' to find and contact the experts within the respective enterprises boundaries. The pattern recognition capabilities 515B involve advanced analytics and represents hidden patterns from the social network analysis module 505. The predictive modeling capabilities 515C involves advanced analytics and represents forecasting capabilities with active insights layer to enhance output to the respective enterprise one or business processes.

The social information aggregation module 520 may provide the aggregated information of the multiple users' expressions and the community dialogue to generate a single expression. The aggregation process may require several statistical and mathematical functions and the consumer service. The social information aggregation module 520 comprises at least one of an aggregated intelligence 520A or an aggregated quality rank 520B to generate the single expression.

The value chain intelligence module 525 may represent analytical processes and results to improve value chain performance of the respective enterprises. The value chain intelligence module 525 may comprise at least one of value chain insight capabilities 525A or value chain visibility 525B capabilities. The value chain insights 525A gathers analytical processes and results for enterprises value chain. The value chain visibility 525B gathers non analytics information captured from users expression and user generated content of specific external stakeholders with in the respective enterprises value chain.

The dynamic profile management module 530 may be used to manage the profile of the multiple users or the communities dynamically. The dynamic profile management module 530 may include at least one of an user profile management capabilities 530A or a community management capabilities 530B or a relationship management capabilities 530C or a preference management capabilities 530D or a preference management capabilities 530E or a relevance management capabilities 530F or a subscription management capabilities 530G or a reputation management capabilities 530H or combinations thereof. The user profile management capabilities 530A typically manage the multiple users profile within the respective enterprises systems. The user profile management capabilities 530A manage the multiple users profile and characteristics as relevant for Web 2.0. The community management capabilities 530B may include maintenance and management of communities' characteristics or the type of communities or the corresponding communities' manager or the corresponding communities' members. The relationship management capabilities 530C may involve maintenance of users' association with the capabilities of the social networking module 310. The preference management capabilities 530D may involve user preferences on the widgets 255 or the blogs 240 or etc. The relevance management capabilities 530E may dynamically derive a list of the Web 2.0 capabilities relevant for potential consumptions by the users. The subscription management capabilities 530F may enable multiple users to subscribe to notifications. Thus enabling the multiple users to know about the associated changes in social networking module 310. The reputation management capabilities may enable the respective enterprise to suppress or edit or highlight the user expression capabilities 305 or the community expression capabilities 310 or the user generated content management module 315. Thus managing reputation of the respective enterprises or its stakeholders without causing damages to the enterprises policies.

The reports module 535 uses core capability of report design and generation from the enterprises information management 230. The reports 535 specially associated with Web 2.0 capabilities for e.g. report for lists of communities or the report for the list of Blogs or etc.

The alerts and notifications module 540 uses core capabilities of the Web 2.0, including messaging from the enterprises computing infrastructure platform 112.

The real time intelligence module 545 enables real time information integration and right time delivery of the integrated information within the appropriate communities or users.

Figure 6:
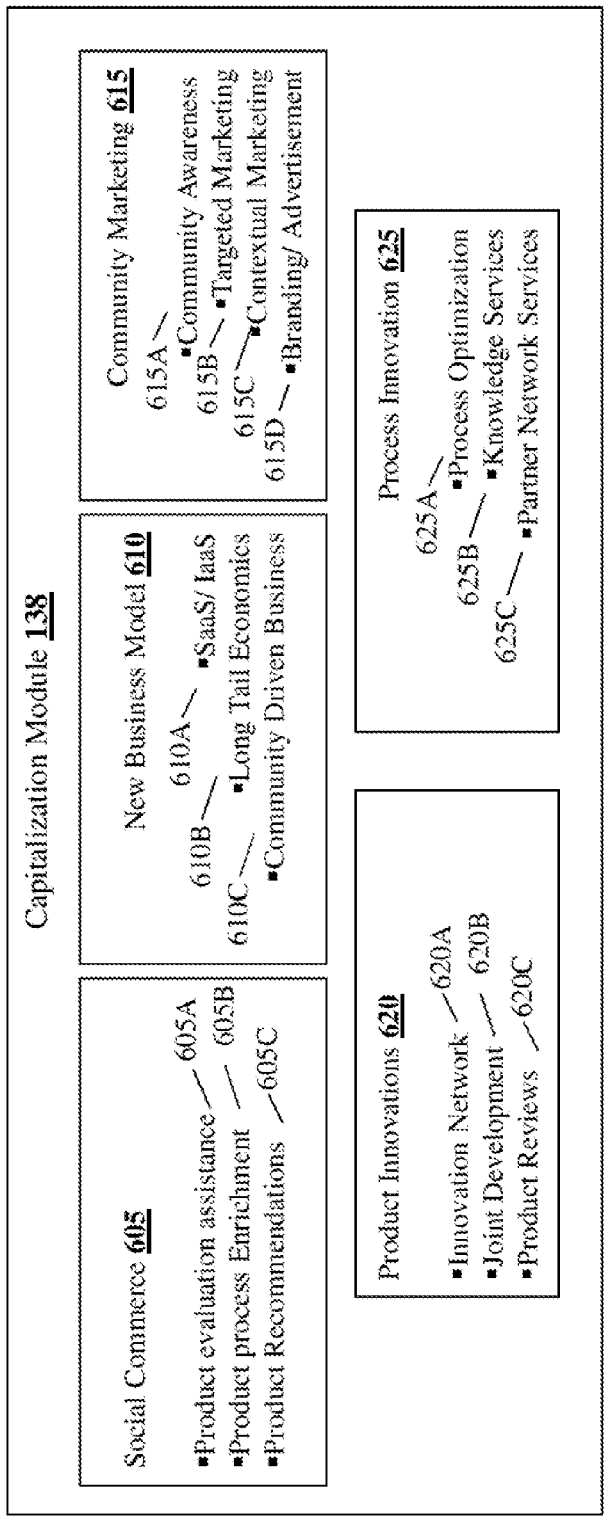
FIG. 6 is a block diagram showing a capitalization module configured in Web 2.0 technology platform for providing the respective enterprises to derive business value from the Web 2.0 solutions, according to one embodiment of the present technique.

FIG. 6 is a block diagram showing the capitalization module 138 enabling the respective enterprises to drive business value from the Web 2.0 solutions, according to one embodiment of the present technique. The capitalization module 138 is configured with at least one or more modules to enable the respective enterprises to drive business value from the Web 2.0 solutions.

In one embodiment of the present technique, the capitalization module 138 may include various modules including at least one of a social commerce module 605 or a new business model module 610 or a community marketing module 615 or a product innovation module 620 or a process innovation module 625 or combinations thereof.

The social commerce module 605 may enable the Web 2.0 capabilities from improving the product sales. The social commerce 605 may influence the multiple users during each phase the buying process by deploying and integrating various capabilities of the experience enrichment module 136 or the user participation module 135 and the active insights module 137. The social commerce 605 comprises at least one of a product evaluation assistance capabilities 605A or a product recommendations capabilities 605B or a purchase process enrichment capabilities 605C or combinations thereof. The product evaluation assistance capabilities 605A may integrate product reviews with the online buyers. The product recommendations capabilities 605B may influence the online buyers' decisions. The purchase process enrichment capabilities 605C may enrich the actual online purchase process by providing at least one of a drag drop products into the shopping cart using the RIA 205 or using the single click product purchase or etc.

The new business model sub model 610 provides insights about new business opportunity such as a Software as a Service (SaaS)/Information as a Service (IaaS) 610A or a long tail economics 610B or a community driven business 610C for the particular enterprises.

The community marketing module 615 may influence or trigger the respective enterprises to understand the needs or wants of the communities. The community marketing module 615 includes the respective enterprise providing a community awareness capabilities 615A or a target marketing capabilities 615B or a contextual marketing 615C or a branding/advertisement capabilities 615D or combinations thereof.

The product innovation module 620 includes at least one of an innovation network capabilities 620A to automate the process of idea management for new product or a joint development capabilities 620B to collaborate with the multiple users/partners/service developers or a product reviews 620C to involve partners and other external stake holders in process innovation by using social network 310.

The process innovation module 625 includes process optimization capabilities 625A to automate the process of idea management for the purpose of new process or a knowledge service 625B to enable transparency and sharing of process knowledge or a partner network service 625C to involve the partners and other external stake holders in process innovation by using social network.

Figure 7:
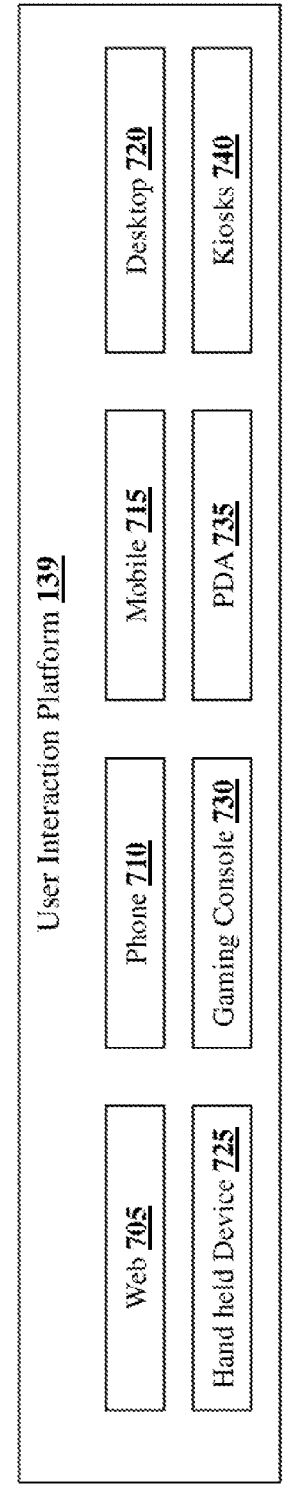
FIG. 7 is a block diagram showing an user interaction platform for providing various communications channels for plurality of users to participate in the respective enterprises one or more business activity, according to one embodiment of the present technique.

FIG. 7 is a block diagram showing the user interaction platform 139 for providing various communications channels for plurality of users to participate in the respective enterprises one or more business activity, according to one embodiment of the present technique. The user interaction platform 139 includes the platform that enables the end users interactions across various communication channels. The module 139 identifies the necessary infrastructure through which the respective enterprises may be connected to different stake holders. The platform includes at least one of a web 705 or a phone 710 or a mobile 715 or a desktop 720 or a hand held device 725 or a gaming console 730 or a PDA 735 or a kiosks 740 or combinations thereof.

In one embodiment of the present technique, a knowledge base may be used either to suggest the necessary computing infrastructure changes to the respective enterprises or for suggesting necessary changes or addition of new elements to the current support systems of the respective enterprises or both. The knowledge base may include best practices or check lists which can be referred in suggesting changes/addition to support system and computing infrastructure or both.

FIG. 8 is a block diagram showing one or more modules configured in a governance model 142 for defining a controlled structure in implementation of Web 2.0 solutions, according to one embodiment of the present technique. The user governance model 142 is configured with at least one or more modules for providing controlled structure for successful implementation and realization of Web 2.0.

In one embodiment of the present technique, the governance model 142 may includes various phases including at least one of a Web Realization Cycle 805 (herein after referred as "WRC") or a Web 2.0 strategy module 810 or a program management module 815 or a business process module 820 or a agile development module 825 or a measurement metrics module 830 or a maturity module 835 or combinations thereof.

In one embodiment of the present technique, the WRC 805 may define the lifecycle of Web 2.0 initiatives for the respective enterprises. The significant business benefits may be obvious, when the respective enterprise takes one or more full iteration through the WRC 805 lifecycle. The WRC 805 lifecycle further comprises at least one of an engage phase 805A or an enrich phase 805B or an empower phase 805C or an encash phase 805D or combinations thereof.

The engage phase 805A may involve building architecture of participation by engaging the multiple users in the respective enterprises one or more business activities. The engage phase 805A may be configured by creating various channels for collaboration amongst users as well between users and the respective enterprises.

The enrich phase 805B may include providing multiple users at least one of a richness of visual appeal or an ease of use or variety or combinations thereof. The enrichment phase 805B may also be implemented by improving the sheer quality and range of products and services that are offered by the respective enterprises.

The empower phase 805C may involve providing enhanced information and insights to the multiple users to empower the users to make right decisions.

The encash phase 805D may provide the respective enterprises to fully capitalize on the Web 2.0 by involving integration and extension of one or more Web 2.0 features build during the earlier phases of the WRC 805 life cycle.

In one embodiment of the present technique, The respective enterprises may start with any of the engage phase 805A or enrich phase 805B and then the respective enterprises may route through empower phase 805C or encash phase 805D. The selection of the phase for the respective enterprises is optional and iterative.

The Web 2.0 strategy module 810 of the governance model 142 may help the respective enterprises to identify business goals that need to be accomplished using the Web 2.0. The strategy set using the module 810 helps the respective enterprises to translate the features of the Web 2.0 for the purpose of meeting the business goals of the respective enterprises. The strategy may be devised in a phased manner using the WRC 805. Based on the demands of the business goals the respective enterprises may choose to take either partial or multiple full iterations through the WRC 805 lifecycle.

The program management module 815 of the governance module 142 may be devised based on the complexity of the Web 2.0 strategy module 810. The program management module may recommend the respective enterprises to deploy a program management or a program management structure for Web 2.0 strategic module 810 executions.

The business processes module 820 may include the business processes required to support Web 2.0 strategy module 810.

The development processes module 825 includes agile development process, which enable flexibility required to follow the multiple iterations through the WRC 805. The respective enterprises considering implementation of SaaS/IaaS capabilities may essentially require adapting the needs of perpetual beta as per Web 2.0 definition.

The measurement metrics module 830 is a measurement of successful implementation of the WRF in the respective enterprises. The success of Web 2.0 depends on the strategy set as per the Web 2.0 strategy module 810. The respective enterprises may define the metrics to measure both the efficiency and effectiveness of the chosen Web 2.0 features based on the success factors for the corresponding business goals set from the respective enterprises.

The maturity assessment module 835 is associated with gauging the existing capabilities that demonstrating the Web 2.0 capabilities. The respective enterprises may refer to the various capabilities in WRF integrated layers to assess Web 2.0 maturity level.

Figure 9:
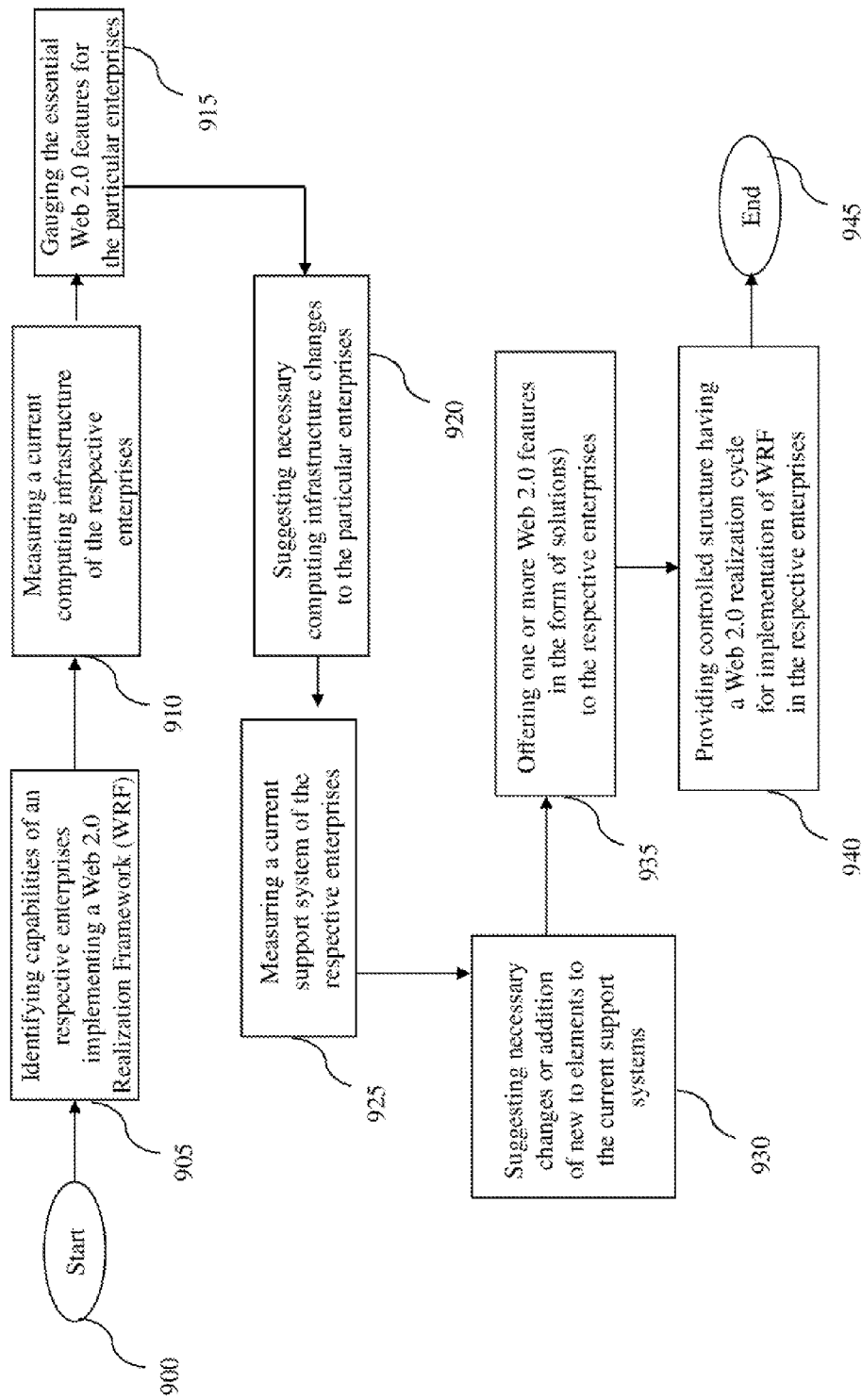
FIG. 9 is a flow diagram illustrating a method for implementing the WRF in the respective enterprises, in one embodiment of the present technique.

FIG. 9 is a flow diagram illustrating the method for implementing the WRF in the respective enterprises, in one embodiment of the present technique. The method comprising: 1) starting to shape the Web 2.0 Realization Framework (WRF) to the plurality of enterprises (block 900), 2) identifying capabilities of an respective enterprises implementing a WRF (block 905), 3) measuring a current computing infrastructure of the respective enterprises (block 910), 4) gauging the essential Web 2.0 features for the particular enterprises (block 915), 5) suggesting necessary computing infrastructure changes to the particular enterprises (block 920), 6) measuring a current support system of the respective enterprises (block 925), 7) suggesting necessary changes or addition of new to elements to the current support systems (block 930), 8) offering one or more Web 2.0 features to the respective enterprises (block 935), 9) providing controlled structure having a Web 2.0 realization cycle for implementation of WRF in the respective enterprises (block 940), and 10) ending the process of implementing WRF framework in the respective enterprises (block 945). Each of the steps will be explained in greater extent in the subsequent sections as follows.

In step 900, the process of incorporating the WRF framework as per the requirement of the respective enterprise is started. In step 905, the capabilities of the respective enterprise implementing the Web 2.0 is identified. The identified capabilities of the respective enterprises are assessed by measuring, step 910. The measuring of capabilities of respective enterprises includes a current computing infrastructure and also the plurality of Web 2.0 features required by the respective enterprise, step 920. In step 915, if any features or updates the respective enterprises need to incorporate is suggested. In step 925, the current support system of the respective enterprises is measured, to check whether the support systems the respective enterprises have are enough to implement the Web 2.0 features as per the WRF. In step 930, any suggesting necessary changes or addition of new to elements to the current support systems of the respective enterprises is provided. In step 935, the respective enterprises are offered with one or more features of Web 2.0 to maximize the business benefit. In step 940, the respective enterprises are also provided with Web realization cycle (WRC) for controlled implementation of the WRF in the plurality of enterprises. Step 945, marks the end of the incorporating the WRF as per the requirement of the respective enterprise, according to one embodiment of the present technique. The method of incorporating the WRF as per the requirement of the respective enterprises is detailed out in the exemplary example to be illustrated below. In one embodiment of the present technique, the steps mentioned above are iterative process and may be followed sequentially. The steps may be followed in a cyclic manner for implementing WRF in respective enterprises. The exemplary example illustrated below should not be restrictive, in light of the present technique.

Figure 10:
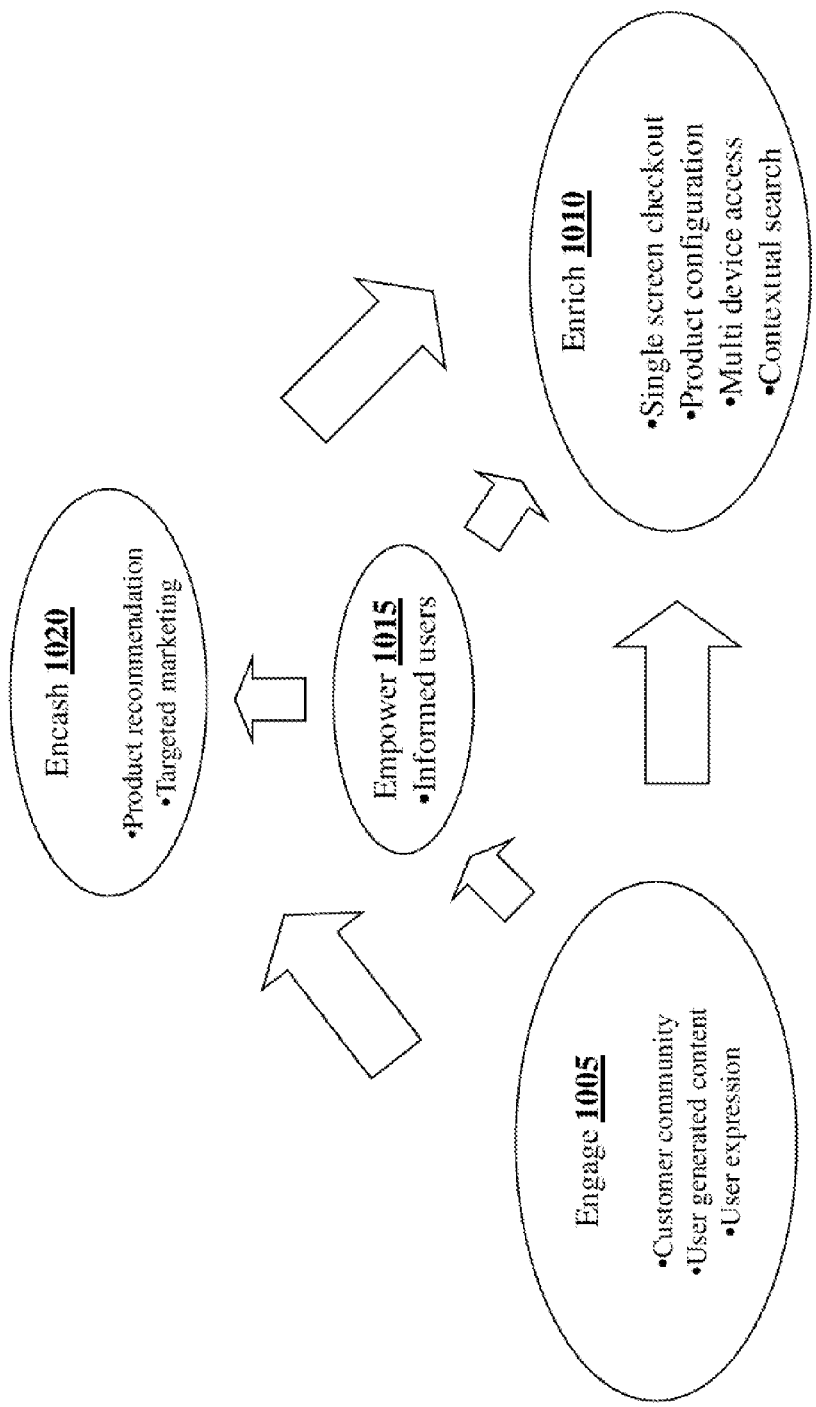
FIG. 10 is an exemplary example illustrating an approach for implementation the WRF in the plurality of enterprises, according to one embodiment of the present technique.

FIG. 10 is an exemplary example illustrating an approach for implementation the WRF in the plurality of enterprises, according to one embodiment of the present technique. In the exemplary example an enterprise named ACME is considered to demonstrate the complete stages of implementation of WRF. ACME is assumed to produce consumer electronics devices like a camera or a mobile or a games or etc. The ACME currently uses B2C application to sell its products. The ACME may adopt a phased realization approach using the WRC 805 life cycle as proposed in WRF. In the first realization cycle ACME may adopt some of the social commerce features of Web 2.0 in the B2C application. In the enrich phase 1010 of the life cycle, ACME may enrich the shopping experience of the customers by providing a single screen, wherein customers may browse through product catalogue or add products to shopping cart and provide credit card details in a single screen instead of current multi screen checkout. The Web 2.0 applications configured for the ACME enterprises may also facilitate the customer to configure some attributes of products according to the users' preferences. The multiple user may be provided with rich graphical interface using at least one of the RIA technologies like AJAX or flash or WPF or combinations thereof. The multiple users may also be provided with services like contextual product information, assisted with product search to assist in purchasing decision. In the engage phase 1005, ACME may enhance B2C application by providing user participation services like customer community, which may assist the multiple users to connect and interact among themselves. The customer community services may set certain community guidelines and invite customers to build community and connect to fellow customers and seek or share information. The ACME site may enable customers to create and share user generated content with Blogs entries or pod-casts or video or etc. Also, the user expression may be captured in the form of product ratings or pools or recommendations or etc. In the empower phase 1015, ACME may use the features like informing the users about the products or community or setting up active alerts or notification to the multiple users or to the community. In the empower phase 1015, ACME may analyze the customer generated contents, customer expressions and community interactions to get insights into customer behavior by using active insights services like SNA or customer analytics or preference management or customer segmentation or combinations thereof. In the encash phase 1020 the insights gained through this analysis may be used by ACME for product recommendation or targeted marketing activities like promotions in the capitalization services.

Figure 11:
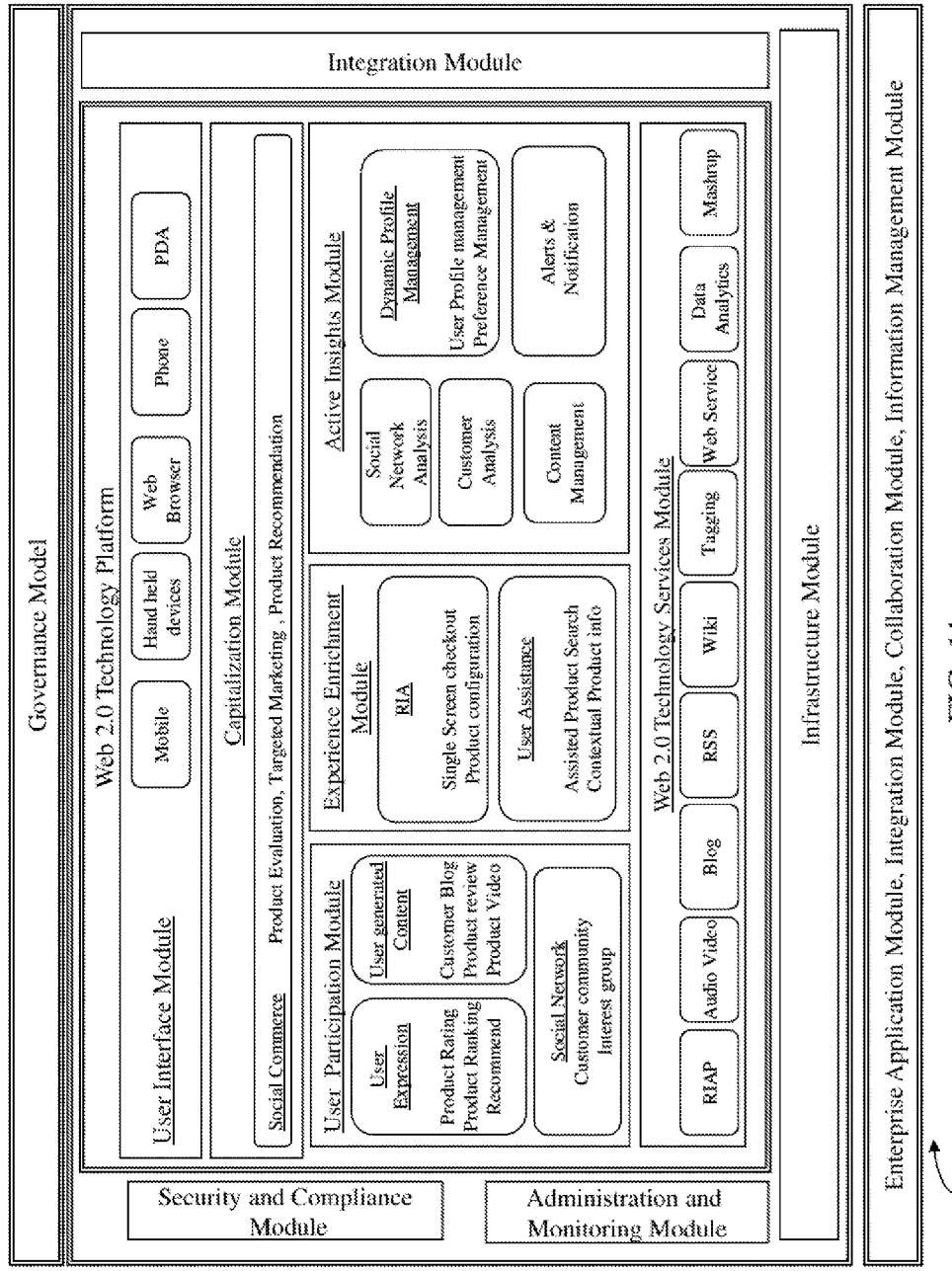
FIG. 11 is an exemplary example illustrating the WRF implemented in the respective enterprises, according to one embodiment of the present technique.

FIG. 11 is an exemplary example illustrating the WRF implemented in the respective enterprises, according to one embodiment of the present technique. The WRF 1100 for realizing of social commerce in the ACME enterprise. The integrated layers of the WRF 1100 are customized based on the required of the ACME enterprises. The WRF is customized as per the enterprises using the WRC life cycle.

The WRF may be used to shape one or more Web 2.0 features for a respective enterprise one or more business activity. The WRF may be used in defining customized solution tailored to the needs and capabilities of the particular enterprises. The WRF may even provide the basis for a detailed assessment of current IT infrastructure and help identify the initiatives to be taken to realize the benefits of Web 2.0. The WRF may help identify and tailor common enterprise services required to support Web 2.0 capabilities. The phased approach as recited in the WRC 805 life cycle may be used to prioritize different Web 2.0 initiatives in a controlled and phased manner.

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

Exemplary Computing Environment

Figure 12:
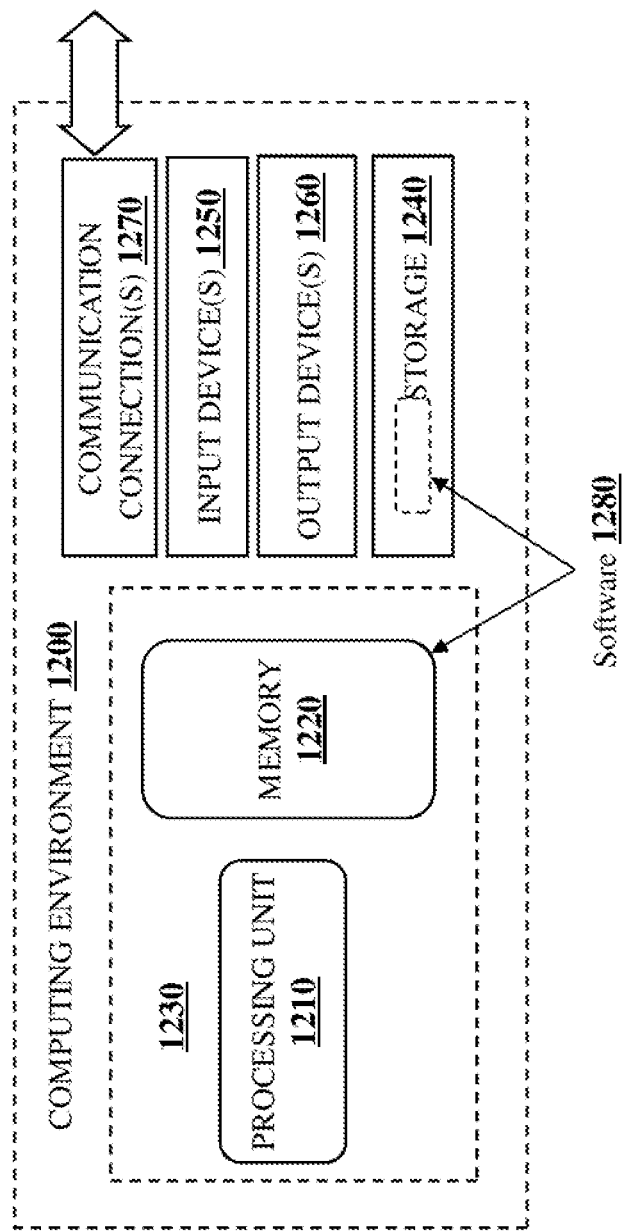
FIG. 12 is a system illustrating a generalized computer network arrangement, in one embodiment of the present technique.

One or more of the above-described techniques can be implemented in or involve one or more computer systems. FIG. 12 illustrates a generalized example of a computing environment 1200. The computing environment 1200 is not intended to suggest any limitation as to scope of use or functionality of described embodiments.

With reference to FIG. 12, the computing environment 1200 includes at least one processing unit 1210 and memory 1220. In FIG. 12, this most basic configuration 1230 is included within a dashed line. The processing unit 1210 executes computer-executable instructions and may be a real or a virtual processor. In a multi-processing system, multiple processing units execute computer-executable instructions to increase processing power. The memory 1220 may be volatile memory (e.g., registers, cache, RAM), non-volatile memory (e.g., ROM, EEPROM, flash memory, etc.), or some combination of the two. In some embodiments, the memory 1220 stores software 1280 implementing described techniques.

A computing environment may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and which can be accessed within the computing environment 1200. In some embodiments, the storage 1240 stores instructions for the software 1280.

The input device(s) 1250 may be a touch input device such as a keyboard, mouse, pen, trackball, touch screen, or game controller, a voice input device, a scanning device, a digital camera, or another device that provides input to the computing environment 1200. The output device(s) 1260 may be a display, printer, speaker, or another device that provides output from the computing environment 1200.

The communication connection(s) 1270 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1200, computer-readable media include memory 1220, storage 1240, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A method for implementing a Web 2.0 realization cycle for establishing a Web 2.0 Realization Framework in a plurality of enterprises, the method comprising executing, using at least one computer processor, the steps of:
   identifying capabilities of the plurality of enterprises by measuring a current computing infrastructure of each of the plurality of enterprises;
   determining one or more Web 2.0 features for implementation at each of the plurality of enterprises based on the identified capabilities of each of the plurality of enterprises;
   ascertaining changes to the current computing infrastructure of the plurality of enterprises for implementation of the one or more Web 2.0 features;
   implementing the Web 2.0 realization cycle for each of the plurality of enterprises via a platform provided for each of the plurality of enterprises based on the determined Web 2.0 features, the implementation of the Web 2.0 realization cycle comprising:
      building one or more user participation modules for active participation of a plurality of users in one or more business activities of the plurality of enterprises;
      providing one or more user experience enrichment modules for enriching overall user experience of the plurality of users;
      providing one or more user active insights modules for empowering the plurality of enterprises with the insights of the plurality of users; and
      providing a capitalization module for encashing the enterprises with business benefits,
   wherein the Web 2.0 realization cycle is employed for establishing the Web 2.0 Realization Framework to offer the one or more Web 2.0 features.

2. The method of claim 1, wherein the Web 2.0 realization cycle for establishing the Web 2.0 Realization Framework in the respective enterprises is an iterative process, enabling the plurality of enterprises to encash maximum business benefit.

3. The method as recited in claim 1, wherein the empowering of the respective enterprises by using active insights module includes at least one of engaging the plurality of users and enriching the plurality of users.

4. The method as recited in claim 1, further comprising identifying the enterprises needs for prioritizing Web 2.0 features.

5. The method as recited in claim 1, further comprising defining a business process for each of the plurality of enterprises to support the establishment of the Web 2.0 Realization Framework.

6. The method as recited in claim 1, further comprising identifying business goals of each of the plurality of enterprises for the Web 2.0 features and establishing the Web 2.0 Realization Framework to achieve the business goals.

7. The method of claim 6, wherein attaining the business goals using the Web 2.0 Realization Framework is measured against a set of metrics laid to measure the efficiency and effectiveness of implementing the Web 2.0 features in the respective enterprises.

8. The method of claim 1, further comprising assessing one or more specific Web 2.0 features with respect to the existing similar features installed in that respective enterprises.

9. The method of claim 1, further comprising identifying a program management structure for each of the plurality of enterprises for strategic or stage wise establishment of the Web 2.0 Realization Framework.

\* \* \* \* \*